United States Patent [19]
Oishi et al.

[11] Patent Number: 5,915,356
[45] Date of Patent: Jun. 29, 1999

[54] METHOD FOR DETECTING POSITION OF FUEL INJECTION QUANTITY ADJUSTING MEMBER OF FUEL INJECTION PUMP AND APPARATUS FOR CARRYING OUT THE METHOD

[75] Inventors: Takashi Oishi; Susumu Yamaguchi; Naoyuki Fukushima, all of Saitama-ken, Japan

[73] Assignee: Zexel Corporation, Tokyo, Japan

[21] Appl. No.: 08/931,242

[22] Filed: Sep. 16, 1997

[30] Foreign Application Priority Data

Sep. 18, 1996 [JP] Japan .................................. 8-267901

[51] Int. Cl.$^6$ .................................................. F02D 31/00
[52] U.S. Cl. ............................................................. 123/357
[58] Field of Search ..................... 123/357, 359, 123/358

[56] References Cited

U.S. PATENT DOCUMENTS

| | | | |
|---|---|---|---|
| 4,708,111 | 11/1987 | Shiozaki et al. ........................ | 123/357 |
| 4,708,112 | 11/1987 | Nanjyo et al. ........................... | 123/357 |
| 5,365,904 | 11/1994 | Nofsinger et al. ...................... | 123/357 |
| 5,613,474 | 3/1997 | Nakamura et al. ..................... | 123/357 |

FOREIGN PATENT DOCUMENTS

8620  2/1992  Japan .

*Primary Examiner*—Thomas N. Moulis

[57] ABSTRACT

In a prescribed low-speed rotation region where a control rack is maintained in a prescribed low-speed side designed position, when a detected position (output voltage) of a rack sensor is offset towards the high load side than the position (voltage) written in a memory, the detected position is written in the memory. In a prescribed high-speed rotation region where a control rack is maintained in a prescribed high-speed side designed position, when a detected position of the rack sensor is offset towards the high load side than the position written in a memory, the detected position is written in the memory. The output characteristic of the rack sensor is calculated based on the detected position written in the memories, and the low-speed side and the high-speed side designed positions. The position of the control rack is calculated from the detected position based on this output characteristic.

10 Claims, 7 Drawing Sheets

METHOD FOR DETECTING POSITION OF FUEL INJECTION QUANTITY ADJUSTING MEMBER OF FUEL INJECTION PUMP AND APPARATUS FOR CARRYING OUT THE METHOD

BACKGROUND OF THE INVENTION

This invention relates to a method for detecting the position of a fuel injection quantity adjusting member of a fuel injection pump and an apparatus for carrying out the method.

In general, a fuel injection pump is provided with a rack sensor (position detector) for detecting the position of a control rack (fuel injection quantity adjusting member), so that the position of the control rack is feed-back controlled or the fuel injection timing is controlled in accordance with a detection signal from the rack sensor.

Conventional rack sensors each comprising a differential transducer have individual difference in output characteristic. Moreover, when a fuel injection pump is attached to a diesel engine, the position of the control rack is appropriately adjusted for each diesel engine, so that a prescribed rated output can be obtained at a prescribed rated speed of rotation. For this reason, if the output of the rack sensor should be used as it is, it would occur that the detected position of the control rack does not correspond to a load condition of the diesel engine.

Therefore, in the device disclosed in Japanese Patent Publication No. 8620/1992, the output characteristic of a rack sensor is calculated based on a prescribed low load side reference position at the time of idling operation of the diesel engine and a prescribed high load side reference position in a predetermined region of rotation at the time of full load operation of the diesel engine, and output voltage (detected position) of the rack sensor at the time of idling operation and full load operation, and the output voltage (detected position) of the rack sensor is corrected based on this output characteristic.

However, since the position of the control rack is greatly affected by irregularity of friction, etc. of the diesel engine when the diesel engine is in an idling state, an actual position of the control rack at idling of the diesel engine is usually adjusted for each diesel engine, so that a target speed of rotation can be obtained for each diesel engine. For this reason, even if an output characteristic of the rack sensor is obtained through calculation in the manner mentioned above, the output characteristic of the rack sensor thus obtained becomes different from a true output characteristic after adjustment. As a consequence, it gives rise to such a problem that the corrected detected position does not correspond to the load condition of the diesel engine.

Moreover, there is also such a problem that since the position of the control rack at idling is always slightly varied, a correct output voltage of the rack sensor is difficult to obtain.

SUMMARY OF THE INVENTION

Figure 3:
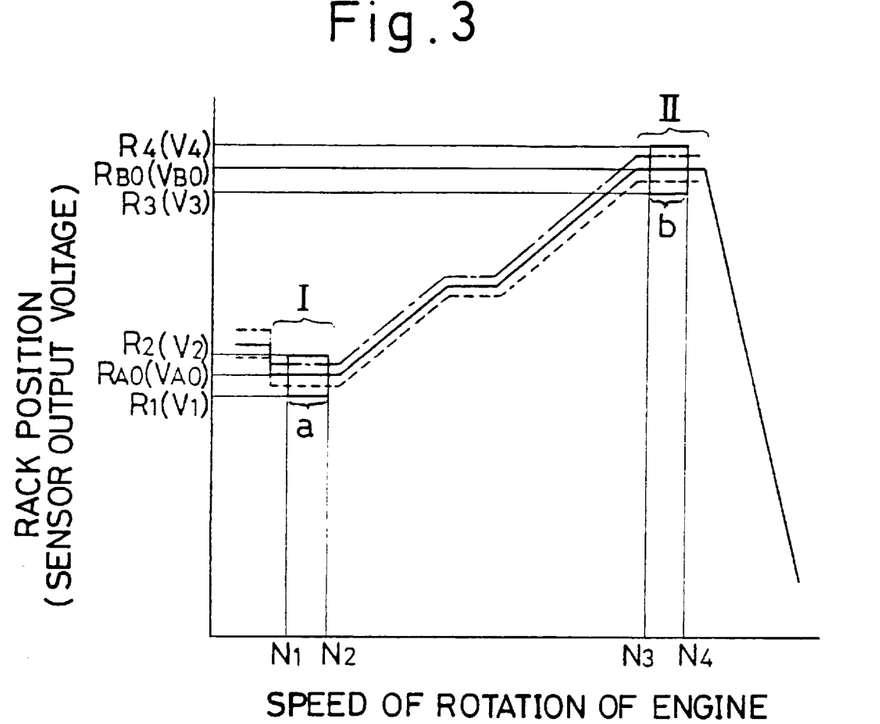
FIG. 3 is a graph showing the characteristic of a governor of a fuel injection pump employed in the embodiment of FIG. 1.
Figure 4:
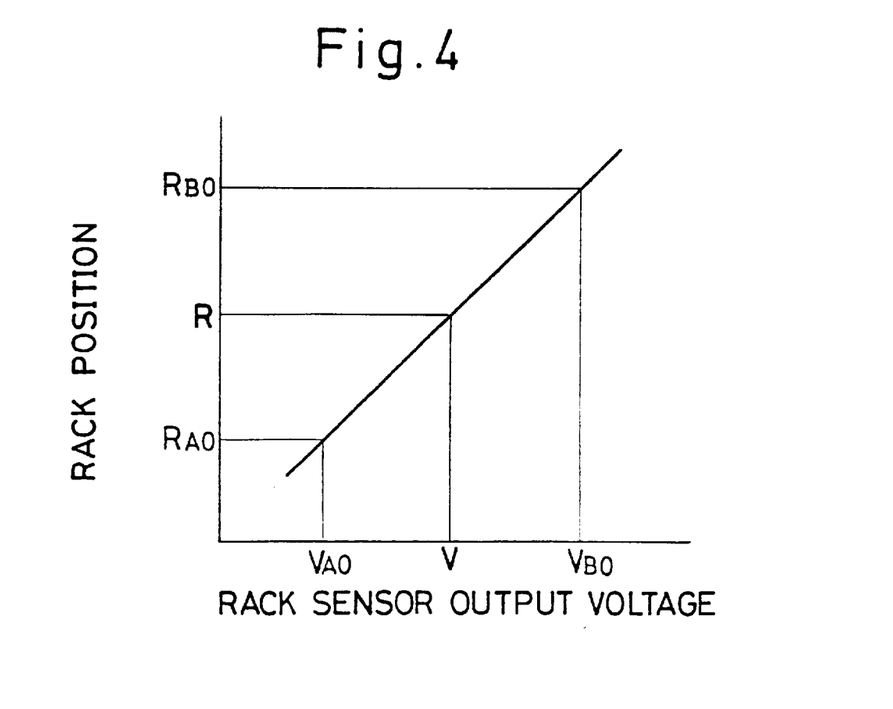
FIG. 4 is a graph showing a relation between the position of a control rack and an output voltage of a rack sensor corresponding thereto.

As a result of extensive search and development made by the inventors of the present invention in order to solve the above-mentioned problems, they have found out the following facts. As shown in FIG. 3, there are known governors in which the position of a control rack is maintained constant in a prescribed regions of speed of rotation I and II (hereinafter simply referred to as the regions I and II) when the diesel engine is operated in a full load condition. In such governors, a difference between the position of the controller rack in the region I and that of the controller rack in the region II is maintained constant in each governor by way of mechanical machining or adjustment with a high degree of precision. Therefore, as shown in FIG. 4, if output voltages (detected positions) of the rack sensor are represented respectively by $V_{A0}$, $V_{B0}$ when the positions (designed positions) of the control rack in the regions I and II are represented respectively by $R_{A0}$, $R_{B0}$, the output characteristic of the rack sensor, i.e., a relation between the position R of the control rack and the output voltage V can be obtained by the following equation.

$$R=\{(R_{A0}-R_{B0})V+R_{B0}V_{A0}-R_{A0}V_{B0}\}/(V_{A0}-V_{B0}) \quad (1)$$

And the position R of the control rack can be obtained (corrected) from the output voltage V of the rack sensor based on this output characteristic.

However, as previously mentioned, when the diesel engine is provided with a fuel injection pump, the position of the control rack is adjusted towards the high-load side or low-load side within a range indicated by a broken line and a one-dot chain line of FIG. 3 for each diesel engine. For this reason, if the output characteristic should be calculated presuming that the positions $R_{A0}$, $R_{B0}$ of the control rack are constant in any fuel injection pump, an output characteristic corresponding to a load condition of the diesel engine could not be obtained.

In view of the foregoing, in the present invention, a prescribed low-speed side position range ($V_1$ to $V_2$) and a high-speed side position range ($V_3$ to $V_4$) are established with reference to the positions $R_{A0}$, $R_{B0}$ of the control rack within a range of each region I, II, as shown in FIG. 3. Then, presuming that the control rack is located in the low-speed side or high-speed side reference position (designed position) $R_{A0}$, $R_{B0}$ if the output voltage of the rack sensor is within each range of position when the speed of rotation of the diesel engine is in each region I, II, an output characteristic of the above equation (1) is obtained from the positions $R_{A0}$, $R_{B0}$ and the output voltages $V_A$, $V_B$. That is, an output characteristic of the rack sensor is obtained by using $V_A$, $V_B$ instead of $V_{A0}$, $V_{B0}$ in the above equation (1).

However, there is a possibility that the diesel engine is not yet in its full load condition depending on the adjustment of the position of the control rack even if the output voltage V of the rack sensor is within each rack position range ($V_1$ to $V_2$; $V_3$ to $V_4$) when the speed of rotation of the engine is within each region I, II. In such a case, a larger voltage is output when the diesel engine is brought into a full load condition. Therefore, when a larger voltage than that of the previous time is output, an output characteristic is re-calculated based on this output voltage, presuming that this output voltage is the voltages $V_A$, $V_B$ in the full load operation. By doing so, since the irregularity of output characteristic of each rack sensor and the quantity of adjustment when the diesel engine is provided with a fuel injection pump can be absorbed, a rack position corresponding to the load of the engine can be detected.

The present invention has been accomplished based on the above-mentioned finding. According to a feature of the present invention, there is provided a method for detecting a position of a fuel injection quantity adjusting member of a fuel injection pump (2) comprising a fuel injection quantity adjusting member (2a) for determining a fuel injection quantity, and a governor (2b) for maintaining the fuel injection quantity adjusting member (2a) in a low-speed side designed position ($R_{A0}$) and a high-speed side designed position ($R_{B0}$) which are constant respectively in a prescribed low-speed rotation region (I) and a prescribed high-speed rotation region (II) when a diesel engine (1) is rotated in a full load condition, the method comprising:

detecting the position of the fuel injection quantity adjusting member (2a) by position detecting means (4), writing a detected position (V) output from the position detecting means (4) in first memory means ($V_A$) when the under-listed conditions (a) through (c) are satisfied, writing the detected position (V) output from the position detecting means (4) in second memory means ($V_B$) when the under-listed conditions (d) through (f) are satisfied, calculating an output characteristic of the position detecting means (4) based on the detected positions written respectively in the first and second memory means ($V_A$, $V_B$) and the low-speed and high-speed side designed positions ($R_{A0}$, $R_{B0}$), and thereafter, correcting the detected position (V) detected by the position detecting means (4) based on the calculated output characteristic.

(a) A speed of rotation (N) of the diesel engine is within the low-speed rotation region (I).

(b) The detected position (V) output from the position detecting means (4) is within a low-speed side position range ($V_1$ through $V_2$) having a prescribed largeness which is predetermined with reference to the low-speed side designed position ($R_{A0}$).

(c) The detected position (V) output from the position detecting means (4) is offset towards a high-load side from the position which is written in the first memory means ($V_A$).

(d) The speed of rotation (N) of the diesel engine (1) is within the high-speed rotation region (II).

(e) The detected position (V) output from the position detecting means (4) is within a high-speed side position range ($V_3$ through $V_4$) having a predetermined largeness which is determined with reference to the high-speed side designed position ($R_{B0}$)

(f) The detected position (V) output from the position detecting means (4) is offset towards the high-load side from the position which is written in the second memory means ($V_B$).

DETAILED DESCRIPTION OF THE INVENTION

Preferred embodiments of the present invention will now be described in detail with reference to FIGS. 1 through 10.

Figure 1:
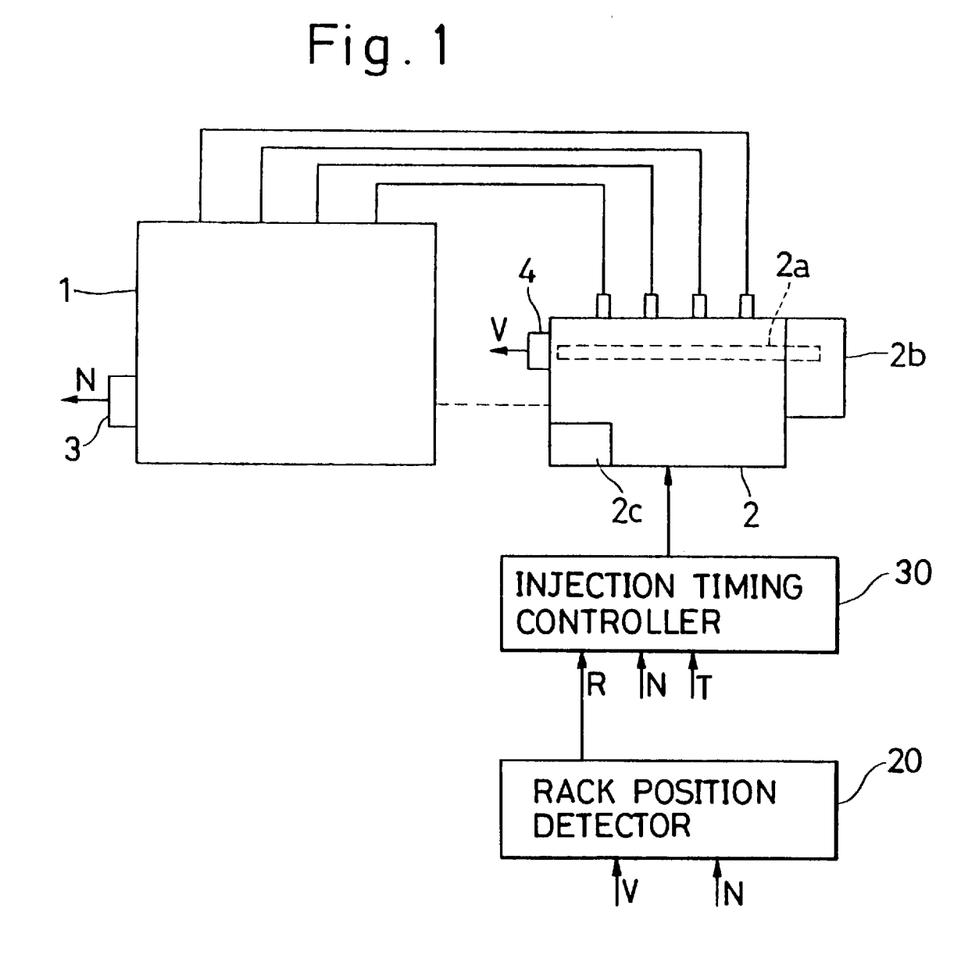
FIG. 1 is a diagram schematically showing a construction of one embodiment of the present invention.

FIG. 1 is a chart schematically showing a construction of one embodiment of the present invention. In this embodiment, a diesel engine 1 activates a fuel injection pump 2, and the fuel injection pump 2 pressurizes fuel. Such pressurized fuel is supplied to the diesel engine 1. The fuel injection pump 2 includes a control rack (fuel injection quantity adjusting member) 2a and a governor 2b. The governor 2b adjusts the position of the control rack 2a in accordance with the load to the diesel engine 1 and the speed of rotation of the diesel engine 1. Then, the quantity of fuel to be supplied to the diesel engine 1 is adjusted in accordance with the position of the control rack 2a.

The position of the control rack 2a is detected by a position detector 20 according to the present invention. In accordance with the position of the control rack 2a thus detected, a fuel injection timing controller 30 controls a timer 2c for adjusting the fuel injection timing of the fuel injection pump 2.

When the diesel engine is in a state of full load, the governor 2b controls such that the position of the control rack 2a will be as indicated by a solid line of FIG. 3. That is, the control rack 2a is maintained in a prescribed position (designed position on the low-speed side) $R_{A0}$ in a prescribed low-speed rotation region I, and it is maintained in a prescribed position (designed position on the high-speed side) $R_{B0}$ in a prescribed high-speed rotation region II. It should be noted, however, that when the fuel injection pump 2 is installed on the diesel engine 1, the position of the control rack 2a is adjusted such that the diesel engine 1 will produce a prescribed rated output at a prescribed rated speed of rotation. As a consequence, an actual governor characteristic becomes such that a characteristic indicted by a solid line of FIG. 3 is displaced in parallel relation towards the high-load side (upper side) or the low-load side (lower side) within a range indicated by a broken line and a one-dot chain line of FIG. 3.

The rack position detector 20 includes a micro computer (not shown), a rack sensor 4 (position detecting means) 4 for detecting the position of the control rack 2a, and a rotation sensor 5 for detecting the speed of rotation of the diesel engine 1. The micro computer calculates to obtain an output characteristic of the rack sensor 4 in accordance with the flowchart of FIG. 2. Thereafter, the micro computer corrects an output voltage (detected position) V of the rack sensor 4 to a signal (control rack position) R corresponding to the load acting on the diesel engine 1 and then outputs the same to an injection timing controller 30.

Figure 2:
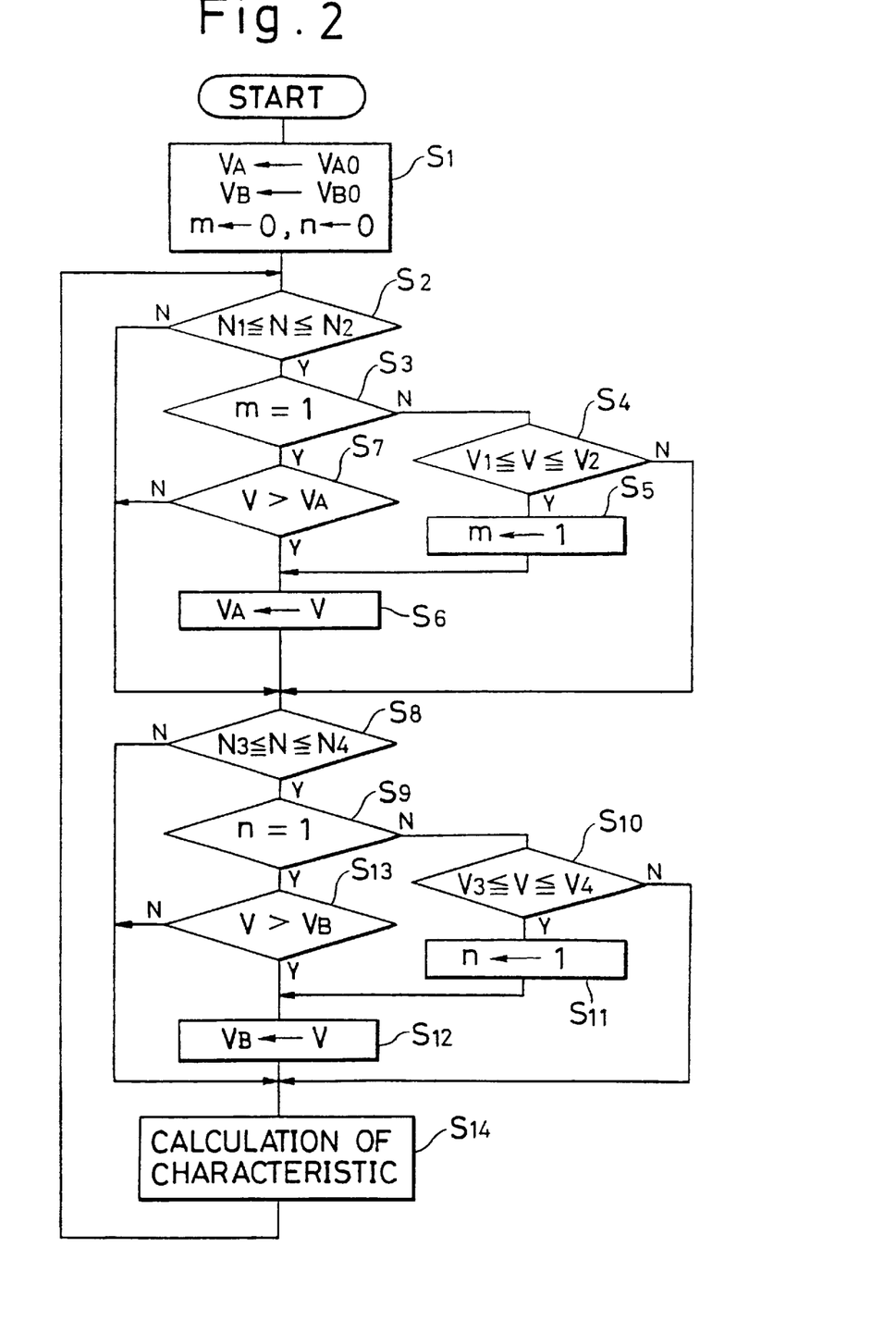
FIG. 2 is a flowchart for explaining the operation of the embodiment of FIG. 1.

FIG. 2 shows a flowchart of a program installed in the micro computer. The micro computer calculates to obtain an output characteristic of the rack sensor 4 in accordance with this program. This program is executed once the diesel engine 1 is started in operation. After the start of this program, an initialization procedure is performed in step $S_1$ first. As a result of this initialization procedure, a voltage $V_{A0}$ corresponding to the low-speed side designed position $R_{A0}$ is written in a memory (first memory means) $V_A$, and also, a voltage $V_{B0}$ corresponding to the high-speed side designed position $R_{B0}$ is written in a memory (second memory means) $V_B$. Also, 0 is written in each of the memories m and n.

Subsequently, in step $S_2$, it is judged whether or not the speed of rotation N of the diesel engine 1 is within the region of rotation determined by the speed of rotation $N_1$, $N_2$. If the speed of rotation N is within the region of rotation I of FIG. 3, the speed of rotation $N_1$, $N_2$ may be optionally established inasmuch as $N_1 < N_2$ is established. Therefore, the region of rotation determined by the range of speed of rotation a (hereinafter simply referred to the region a) can be set equal to the low-speed rotation region I. However, the region a determined by the speed of rotation $N_1$, $N_2$ is set smaller than the region of rotation I here. By doing so, it can be ensured that the position of the control rack $2a$ is always constant in the region a irrespective of errors in manufacturing accuracy.

In case $N_1 \leq N \leq N_2$ is established, it is judged in step $S_3$ whether or not m=1. Because an initial value of the memory m is zero (0), it is judged as m≠1 first. Then the process proceeds to step $S_4$. In step $S_4$, it is judged whether or not the detected position V detected by the rack sensor 4 is within the prescribed low-speed side position range which is determined by the position $V_1$, $V_2$ (voltage indicating the position of the control rack $2a$ ) of the control rack $2a$. In other words, it is judged whether or not $V_1 \leq V \leq V_2$ is established. If the forgoing condition is satisfied, one (1) is written in the memory m in step $S_5$, and the detected position V at that time is written in the memory $V_A$ in step $S_6$. In other words, the initial value $V_{A0}$ is renewed in the detected position V.

Here, the positions (voltages indicating the positions of the control rack $2a$) $V_1$, $V_2$ are determined in the following manner, respectively. Presuming that the control rack $2a$ is adjusted in position to the full extent towards the low load side through position adjustment which is performed when the fuel injection pump 2 is attached to the diesel engine 1 and as a result, the low-speed side designed position $R_{A0}$ is brought to a lowest position $R_{L1}$, and that a certain rack sensor has such a characteristic that it outputs a lower voltage with respect to the same position of the control rack than any of the other rack sensors, the position $V_1$ is set to a slightly lower voltage than the voltage which the rack sensor having such a characteristic outputs with respect to the position $R_{L1}$. On the other hand, presuming that the control rack $2a$ is adjusted in position to the full extent towards the high load side through position adjustment which is performed when the fuel injection pump 2 is attached to the diesel engine 1 and as a result, the high-speed side designed position $R_{B0}$ is brought to a highest position $R_{L2}$, and that a certain rack sensor has such a characteristic that it outputs a higher voltage with respect to the same position of the control rack than any of the other rack sensors, the position $V_2$ is set to a slightly higher voltage than the voltage which the rack sensor having such a characteristic outputs with respect to the position $R_{L2}$. Therefore, when the diesel engine 1 is in its full load condition and its speed of rotation N is within a range of $N_1 \leq N \leq N_2$, the detected position V is always within the low-speed side position range ($V_1$ through $V_2$) which is defined by the positions $V_1$, $V_2$.

On the other hand, when it is judged as m=1 in step $S_3$, that is, when $N_1 \leq N \leq N_2$ and $V_1 \leq V \leq V_2$ are established even once after start, it is judged in step $S_7$ whether or not the detected position V is larger than the $V_A$ written in the memory $V_A$. If $V > V_A$, is established, the detected position V at that time is written in the memory $V_A$ in step $S_6$. By doing so, the content in the memory $V_A$ is renewed into a detected position V which is more on the high load side than the position which is written in the memory $V_A$ till that time.

If the judgment is made in the negative in steps $S_2$, $S_4$, $S_7$, the process proceeds to step $S_8$. In step $S_8$, it is judged whether or not the speed of rotation N of the diesel engine 1 is within the region of rotation which is determined by the speed of rotation $N_3$, $N_4$. In other words, it is judged whether or not the speed of rotation N satisfies $N_3 \leq N \leq N_4$. If the speed of rotation $N_3$, $N_4$ is within the high-speed rotation region II of FIG. 3 and satisfies $N_3 \leq N_4$ here, the speed of rotation $N_3$, $N_4$ can be established optionally. Therefore, the region of rotation determined by the speed of rotation $N_3$, $N_4$ can be established equal to the high-speed rotation region II. However, it is established narrower than the high-speed rotation region II here. The reason why such a narrower range is established within the high-speed rotation region II is that, by doing so, the position of the control rack $2a$ is assuredly constant within the region of rotation determined by $N_3$, $N_4$.

In case the speed of rotation N satisfies $N_3 \leq N \leq N_4$, it is judged in step $S_9$ whether or not n=1. Since the initial value of n is zero (0), it is judged as n≠1 first. When such a judgment is made, it is judged in step $S_{10}$ whether or not the detected position V of the rack sensor 4 satisfies $V_3 \leq V \leq V_4$. If the judgment result is affirmative, one (1) is written in the memory n in step $S_{11}$ and the detected position V at that time is written in the memory $V_B$ in step $S_{12}$.

Here, the positions (voltage indicating the position of the control rack $2a$) $V_3$, $V_4$ are determined in the following manner, respectively. Presuming that the control rack $2a$ is fully adjusted to the maximum extent towards the low load side through position adjustment which is performed when the fuel injection pump 2 is attached to the diesel engine and as a result, the high-speed side designed position $R_{B0}$ is brought to the lowest position $R_{H1}$ and that a certain rack sensor has such a characteristic as outputting a lower voltage with respect to the same position of the control rack than any other rack sensors, the position $V_3$ is set to a slightly lower voltage than the voltage which the rack sensor having such a characteristic outputs with respect to the position $R_{H1}$. On the other hand, presuming that the control rack $2a$ is fully adjusted to the maximum extent towards the high load side through position adjustment and as a result, the high-speed side designed position $R_{B0}$ is brought to the position $R_{H2}$ and that a certain rack sensor has such a characteristic as outputting a higher voltage than any other rack sensors with respect to the same position of the control rack, the position $V_4$ is set to a slightly higher voltage than the voltage which the rack sensor having such a characteristic outputs with respect to the position $R_{H2}$. Therefore, if the diesel engine 1 is in its full load condition, and its speed of rotation is within the range of $N_3 \leq N \leq N_4$, the detected position V at that time necessarily satisfies $V_3 \leq V \leq V_4$.

If n=1, in other words, when $N_3 \leq N \leq N_4$ and $V_3 \leq V \leq V_4$ are established even once after start of the program, it is judged in step $S_{13}$ whether or not the detected position V is larger than the $V_B$ written in the memory $V_B$. If $V > V_B$, the detected position V at that time is written in the memory $V_B$ in step $S_{12}$. By doing so, the content in the memory $V_B$ is renewed into a detected position V higher toward the high load side.

After execution of procedure in step S12, or when the judgment is made in the negative in steps $S_8$, $S_{10}$, $S_{13}$, the process proceeds to step $S_{14}$. Then, in step $S_{14}$, an output characteristic expressed by the equation (1) is calculated based in the low-speed side and the high-speed side designed position $R_{A0}$, $R_{B0}$, and the stored contents written respectively in the memories $V_A$, $V_B$. In other words, $V_A$, $V_B$ are used in place of $V_{A0}$, $V_{B0}$ of the equation (1), and an output characteristic of the rack sensor (4) expressed by the following equation (2) is obtained.

$$R\{=(R_{A0}-R_{B0})V+R_{B0}V_A-R_{A0}V_{B0}\}/(V_A-V_B) \quad (2)$$

After execution of the procedure in step $S_{14}$, the process returns to step $S_2$ where the procedures in those steps after step $S_2$ are executed again.

By putting the detected position V, which varies from one minute to the next, into the equation (2) expressing the output characteristic, the position R of the control rack 2a is calculated (corrected). This position R is output to the injection timing controller 30 as shown in FIG. 1. The injection timing controller 30 calculates the injection timing based on the position R, the speed of rotation N of the diesel engine 1, the temperature T of a cooling water of the diesel engine 1, etc., and outputs the result of calculation. The timer 20 is controlled in accordance with the result of calculation. Such a controlling procedure of the timer 20 is the same as known and therefore, description thereof is omitted.

In the position detector 20 according to the present invention, the low-speed and the high-speed side designed position $R_{A0}$, $R_{B0}$, which are accurate and constant in difference are used. In addition, when the detected position V in the regions I, II is larger than the detected position $V_A$, $V_B$ ($V_{A0}$, $V_{B0}$) written in the memories $V_A$, $V_B$ till that time, the content in the memories $V_A$, $V_B$ is renewed to the detected position V. Then, based on the detected position V and the two designed positions $R_{A0}$, $R_{B0}$, the output characteristic of the rack sensor 4 is calculated. Then, the detected position V is corrected based on the result of calculation. By doing so, the position R of the control rack 2a is calculated. Therefore, the position R of the control rack 2a can be corrected to one which corresponds to the load of the diesel engine 1.

In the above-mentioned embodiment, the positions (voltages) $V_{A0}$, $V_{B0}$ corresponding respectively to the low-speed side and the high-speed side designed positions $R_{A0}$, $R_{B0}$ are written respectively in the memories $V_A$, $V_B$ as initial values. However, the initial values may be set to zero (0). In case the initial values are set to zero (0), the detected position V is handled as correct and used directly as the position R of the control rack 2a until the detected position V is written in the memories $V_A$, $V_B$. Of course, the detected position V is corrected based on the output characteristic of the rack sensor 4 after the output characteristic of the rack sensor 4 is calculated.

Another embodiment of the present invention will now be described.

Figure 5:
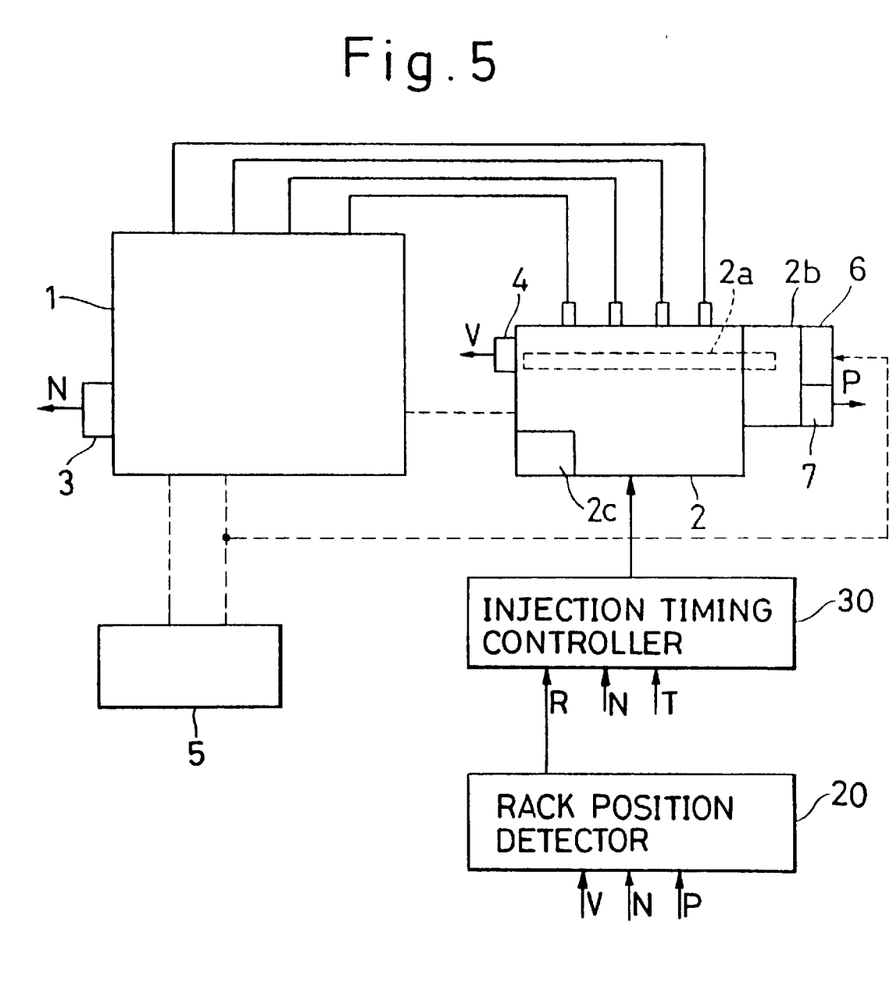
FIG. 5 is a diagram schematically showing a construction of another embodiment of the present invention.
Figure 7:
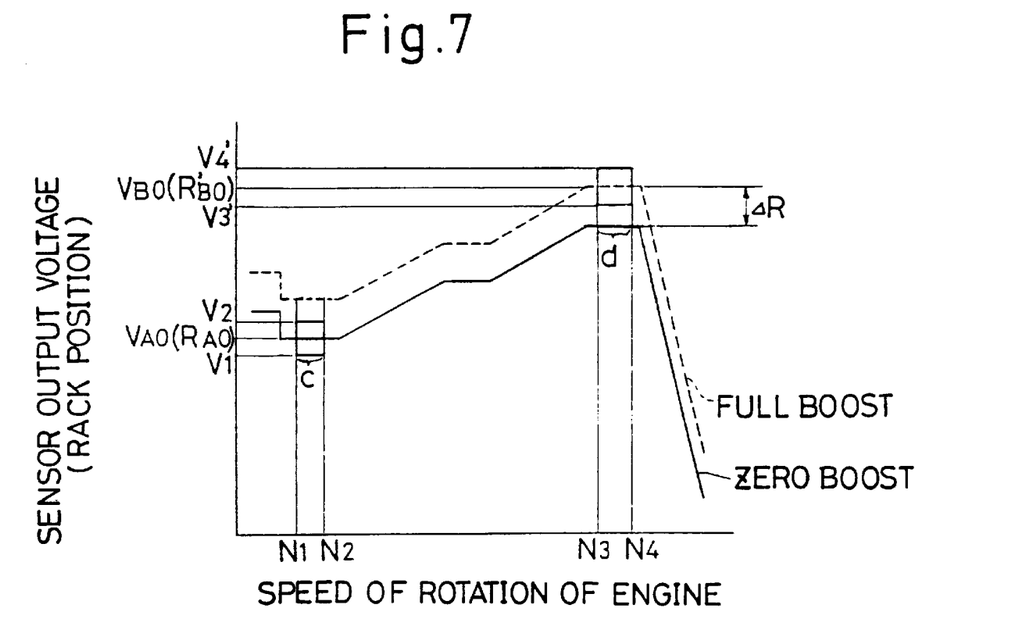
FIG. 7 is a graph showing the characteristic of a governor of a fuel injection pump employed in the embodiment of FIG. 5.

In the embodiment of FIG. 5, a turbo charger 5 driven by an exhaust gas from the diesel engine 1 and for pressurizing an intake gas of the diesel engine 1 is employed. A governor 2b is provided with a boost compensator (position adjusting mechanism) 6. When the boost pressure of an intake gas to be supplied to the diesel engine 1 from the turbo charger 5 is equal to or more than a prescribed pressure, the position of the control rack 2a is adjusted toward the high load side in accordance with the boost pressure of the exhaust gas supplied to the turbo charger 5, by a boost compensator, as shown in FIG. 7.

In the turbo charger attached diesel engine 1, it hardly happens that the diesel engine 1 is brought into a fully boosted condition (condition where the boost pressure is in a pre-set maximum pressure) when the diesel engine 1 is rotated in a full load condition and at a low speed, and that the diesel engine 1 is brought to a zero boosted condition (condition where the boosted pressure is equal to or less than a prescribed pressure) when the diesel engine 1 is rotated in a full load condition and at a high speed. For this reason, it hardly happens that the control rack 2a moves to the positions indicated by reference characters c and d of FIG. 7. For this reason, the output characteristic of the rack sensor 4 is difficult to obtained with reference only to the position of the control rack 2a when the diesel engine 1 is in a zero-boosted condition or in a fully boosted condition.

In view of the above, in this embodiment, for calculating the output characteristic of the rack sensor 4, the low-speed side designed position $R_{A0}$ is used in the above embodiment when the diesel engine 1 is rotated in a full load condition and at a low speed, and the high-speed side designed position $R'_{B0}$ is used in place of the high-speed side designed position $R_{B0}$ when the diesel engine 1 is rotated in a full load condition and at a high speed. The reason is that they are frequently appeared when the diesel engine 1 is actually operated.

Based on the foregoing, a characteristic calculation will now be described with reference to a flowchart of FIG. 6. It should be noted that the boost compensator 6 is provided with the pressure sensor 7 and the boosted pressure P of the intake gas to be introduced into the boost compensator 6 is detected by the pressure sensor 7.

After start of the program, initialization is performed in step $S_{20}$. In other words, the initial values $V_{A0}$, $V'_{B0}$ are written respectively in the memories $V_A$, $V_B$ and zero (0) is written in the memories m, n. Thereafter, it is judged in step $S_{21}$ whether or not $N_1 \leq N \leq N_2$ is established. If the judgment result is "YES", it is judged in step $S_{22}$ whether or not the boosted pressure P is equal to or less than a prescribed boosted pressure $P_0$, i.e., whether or not the boosted pressure P is in a zero (0) boosted condition. If the boosted pressure P is in a zero (0) boosted condition, it is judged in step $S_{23}$ whether or not m=1. If the judgment result in step $S_{23}$ is "NO", it is judged in step $S_{24}$ whether or not $V_1 \leq V \leq V_2$. If the judgment result in step $S_{23}$ is "YES", one (1) is written in the memory m in step $S_{25}$ and thereafter, the detected position V is written in the memory $V_A$ (step $S_{26}$). If m=1 in step $S_{23}$, it is judged in step $S_{27}$ whether or not $V > V_A$. If the judgment result is "YES", the detected position V is written in the memory $V_A$ in step $S_{26}$.

After execution of step $S_{26}$ or if each judgment result in each step $S_{21}$, $S_{22}$, $S_{24}$, $S_{27}$ is "NO", the process proceeds to step $S_{28}$. In step $S_{28}$, it is judged whether or not $N_3 \leq N \leq N_4$. If the judgment result is "YES", it is judged in step $S_{29}$ whether or not n=1. If it is judged as n≠1 in step $S_{29}$, it is judged whether or not $V'_3 \leq V \leq V'_4$ in step $S_{30}$. If the judgment result in step $S_{30}$ is "YES", one (1) is written in n in step $S_{13}$ and thereafter the detected position V at that time is written in the memory $V_B$ in step $S_{32}$. If it is judged as n=1 in step $S_{29}$, it is judged in step $S_{33}$ whether or not $V > V_B$. If the judgment result is "YES", the detected position V is written in the memory $V_B$ in step $S_{32}$. After execution of step $S_{32}$, or if each judgment result in step $S_{28}$, $S_{30}$, $S_{33}$ is "NO", the characteristic of the rack sensor 4 is calculated based on the low-speed side and the high-speed side designed position $R_{A0}$, $R'_{B0}$ and the positions $V_A$, $V_B$ in step $S_{34}$.

The above-mentioned positions (voltages) $V'_3$, $V'_4$ are determined in the same manner as the positions $V_3$, $V_4$ in the above-mentioned embodiment. Those steps after step $S_{21}$ are repeated after execution of the characteristic calculation and the detection position is corrected based on the calculated output characteristic in the same manner as in the above-mentioned embodiment.

In the above-mentioned embodiment, since the output characteristic of the rack sensor 4 is calculated with reference to the positions $R_{A0}$, $R_{B0}$ which are frequently appeared in the boost compensator attached diesel engine 1, the output characteristic of the rack sensor 4 can be calculated frequently. Therefore, the position R of the control rack 2a can be made more closely correspond to the load condition of the diesel engine 1.

A further embodiment of the present invention will now be described.

Figure 8:
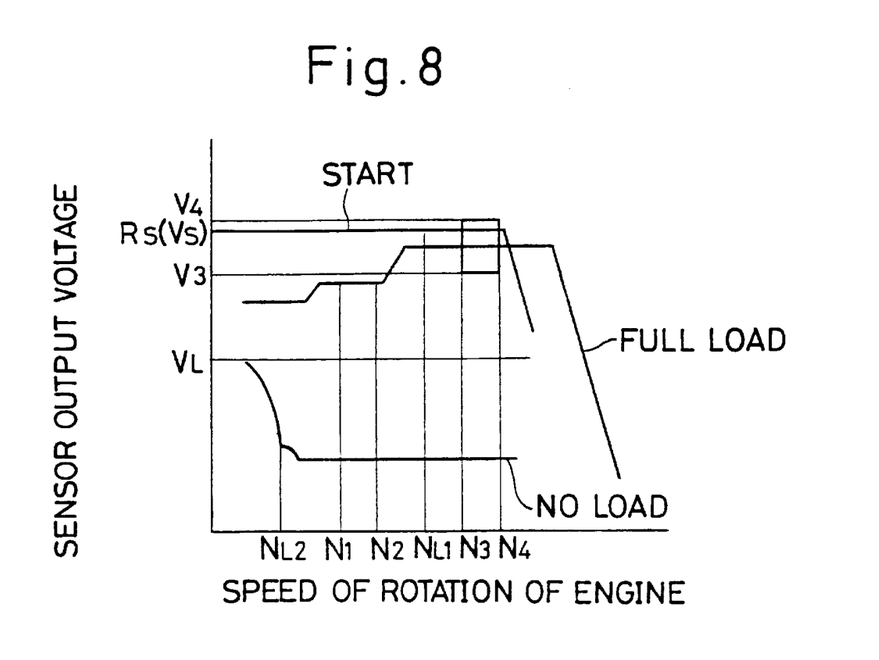
FIG. 8 is a graph showing the characteristic of a governor in full load, start of operation, and no-load.

In general, the position of the control rack 2a is adjusted towards the high load side as shown in FIG. 8 because the fuel injection quantity is increased during the starting period of the diesel engine 1 (increase in quantity during the starting period). However, if the adjustment is performed in this way, it happens that the position $V_S$ of the control rack 2a during the starting period is within a prescribed high-speed side position range $V_3$ to $V_4$ when the speed of rotation N of the diesel engine 1 is within the high-speed rotation range ($N_3 \leq N \leq N_4$). In such a case, if the position $V_S$ of the control rack 2a during the starting period is used as the detected position V, the output characteristic of the rack sensor 4 cannot be calculated correctly.

Figure 6:
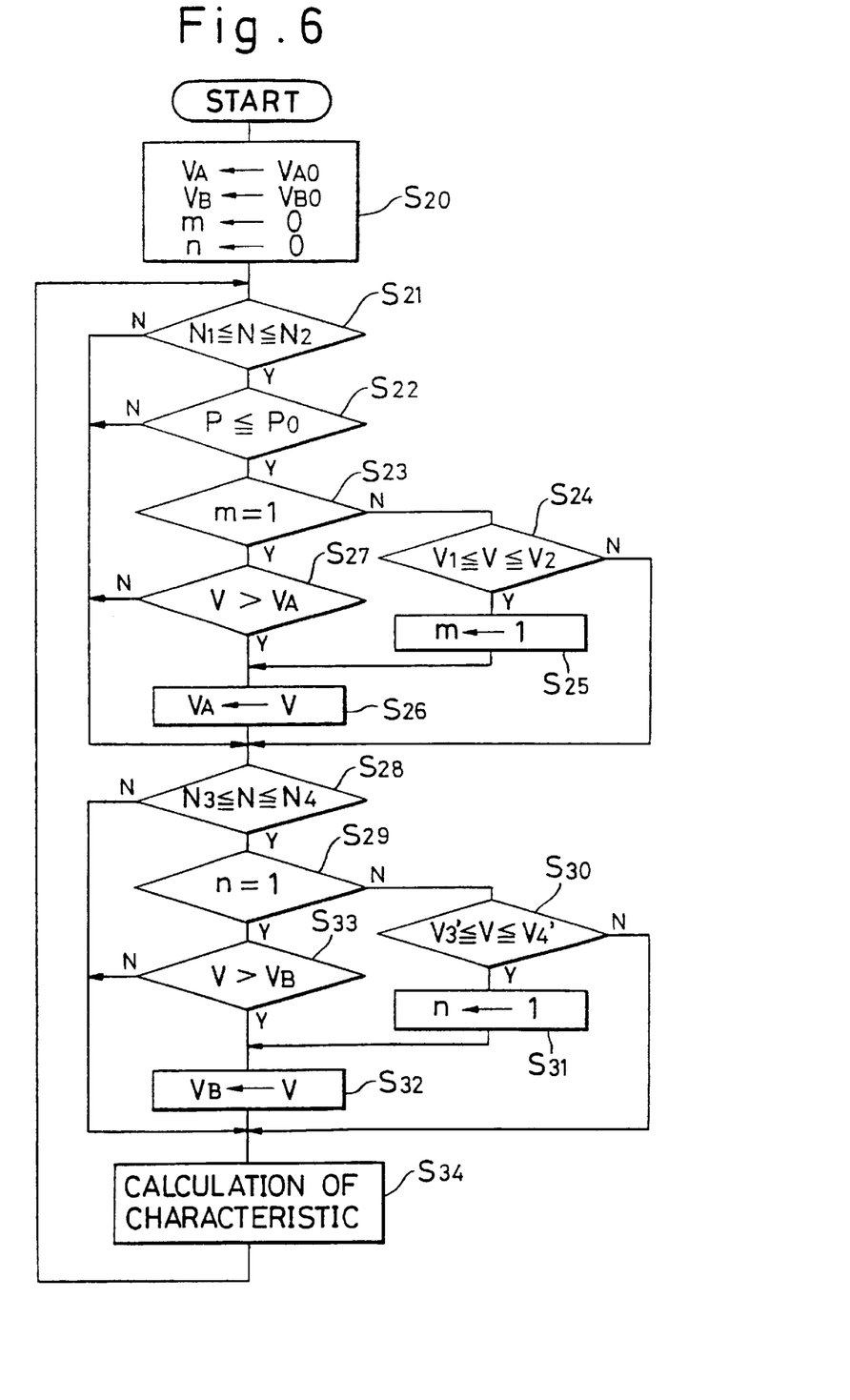
FIG. 6 is a flowchart for explaining the operation of the embodiment of FIG. 5.
Figure 9:
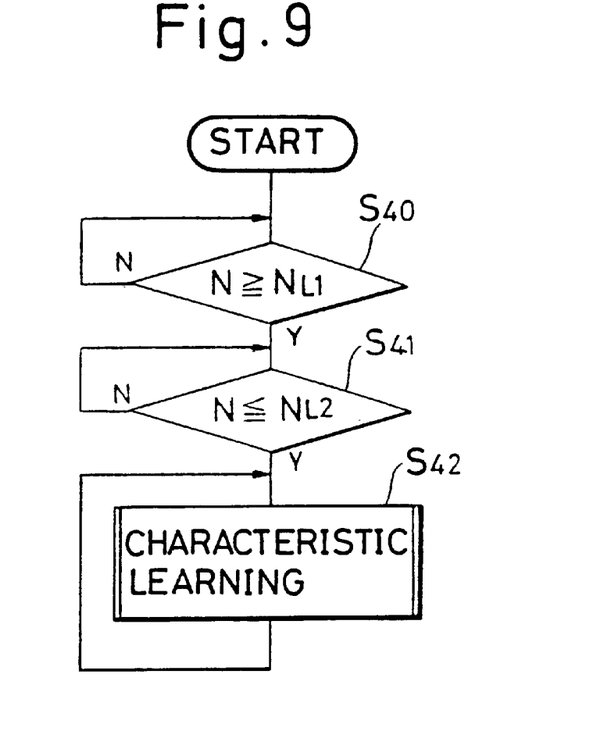
FIG. 9 is a flowchart for explaining the operation of a further embodiment of the present invention.
Figure 10:
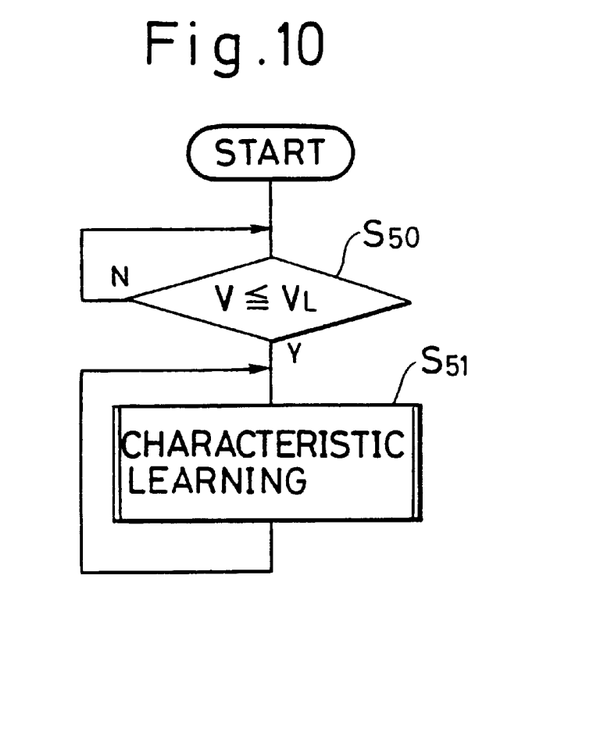
FIG. 10 is another flowchart for obtaining a similar operation to that of FIG. 9.

Therefore, in the present invention, a possible occurrence of the above-mentioned inconveniences is prevented by executing the program of FIGS. 9 or 10 before executing the program of FIGS. 2 or 6 after start of the diesel engine 1.

Specifically, in the program of FIG. 9, after start, it is judged in step $S_{40}$ whether or not the speed of rotation N of the diesel engine 1 is equal to or more than a prescribed speed of rotation $N_{L1}$. The speed of rotation $N_{L1}$ can be set optionally inasmuch as it is equal to or more than the idling speed. However, the speed of rotation $N_{L1}$ is set larger than the speed of rotation $N_2$ here. The above-mentioned judgment is repeatedly made as long as $N<N_{L1}$ is satisfied. When it comes to satisfy $N \geq N_{L1}$, in other words, when the diesel engine is started and begins to rotate at a speed equal to or higher than the idling speed, the process proceeds to step $S_{41}$. In step $S_{41}$, it is judged whether or not $N \leq N_{L2}(<N_{L1})$. The speed of rotation $N_{L2}$ is set approximately equal to the maximum speed of rotation at the idling time or slightly higher towards the high-speed side. As long as $N>N_{L2}$, the same judgment is repeatedly made. The diesel engine 1 is temporarily rotated at a speed equal to or higher than the idling speed after start of engine and then rotated at the idling speed. As a result, when it comes to satisfy $N \leq N_{L2}$, the process proceeds to step $S_{42}$. In step $S_{42}$, a learning of the output characteristic, i.e., a calculation of the output characteristic, of the rack sensor 4, is executed. Of course, the output characteristic is calculated by executing the step $S_2$ onwards when the program is that of FIG. 2, and by executing the step $S_{21}$,onwards are executed when the program is that of FIG. 6.

In this embodiment, the characteristic calculation of the rack sensor 4 is not executed until the diesel engine 1 begins to rotate at the idling speed after start of the diesel engine 1. Therefore, it never happens that the position $V_S$ of the control rack 2a during the starting period is written in the memory $V_B$. For this reason, it can be prevented that the output characteristic of the rack sensor 4 is calculated in an inaccurate manner.

In the program of FIG. 10, after start, it is judged in step $S_{50}$ whether or not the detected position V is smaller than the prescribed position (voltage) $V_L$. The position $V_L$ is set equal to the maximum position at the idling time or slightly higher towards the high load side. As long as $V>V_L$, the judgment as $V \leq V_L$ is continued regarding the increase in quantity during the starting period is undergoing. If it comes to satisfy $V \leq V_L$, the process proceeds to step $S_{51}$ regarding that the increase in quantity at the during the starting period is finished and the diesel engine begins the idling rotation. In step $S_{51}$, the calculation of the output characteristic of the rack sensor 4 is executed in the same manner as in step $S_{42}$.

In this embodiment, since the characteristic calculation of the rack sensor 4 is prohibited until the diesel engine 1 begins the idling rotation after the increase in quantity during the starting period is finished, it never happens that the position $V_S$ of the control rack 2a during the starting period is written in the memory $V_B$.

In the embodiment of FIGS. 9 or 10, the position $V_S$ of the control rack 2a during the starting period is indirectly prohibited from being written in the memory $V_B$ as the detected position V by prohibiting the characteristic calculation of the rack sensor 4. It is also accepted that the position $V_S$ of the control rack 2a is directly prohibited from being written in the memory $V_B$.

What is claimed is:

1. A method for detecting a position of a fuel injection quantity adjusting member of a fuel injection pump comprising a fuel injection quantity adjusting member for determining a fuel injection quantity, and a governor for maintaining the fuel injection quantity adjusting member in a low-speed side designed position and a high-speed side designed position which are constant respectively in a prescribed low-speed rotation region and a prescribed high-speed rotation region when a diesel engine is rotated in a full load condition, the method comprising:

detecting the position of said fuel injection quantity adjusting member by position detecting means, writing a detected position output from said position detecting means in first memory means when the under-listed conditions (a) through (c) are satisfied, writing the detected position output from said position detecting means in second memory means when the under-listed conditions (d) through (f) are satisfied, calculating an output characteristic of said position detecting means based on the detected positions written respectively in said first and second memory means and said low-speed and high-speed side designed positions, and thereafter, correcting the detected position detected by said position detecting means based on the calculated output characteristic, (a) a speed of rotation of said diesel engine is within the low-speed rotation region;

(b) the detected position output from said position detecting means is within a low-speed side position range having a prescribed largeness which is predetermined with reference to said low-speed side designed position;

(c) the detected position output from said position detecting means is offset towards a high-load side from the position which is written in said first memory means;

(d) the speed of rotation of said diesel engine is within the high-speed rotation region;

(e) the detected position output from said position detecting means is within a high-speed side position range having a predetermined largeness which is determined with reference to said high-speed side designed position;

(f) the detected position output from said position detecting means is offset towards the high-load side from the position which is written in said second memory means.

2. A method for detecting a position of a fuel injection quantity adjusting member of a fuel injection pump according to claim 1, wherein said diesel engine is provided with a charger, said governor is provided with a position adjusting mechanism for adjusting a position of said fuel injection quantity adjusting member in such a manner as to correspond to a boosted pressure when the boosted pressure of an intake gas to be supplied to said diesel engine from said charger is equal to or more than a prescribed pressure, said low-speed side position range is determined with reference to a low-speed side designed position in a full load condition of said diesel engine when said boosted pressure is equal to or less than said prescribed pressure, and said high-speed side position range is determine with reference to a high-speed side designed position in a full load condition of said diesel engine when said boosted pressure is maximum.

3. A method for detecting a position of a fuel injection quantity adjusting member of a fuel injection pump according to claim 1 or 2, wherein said governor includes a starting time quantity increasing mechanism for moving said fuel injection quantity adjusting member towards the high load position side than a position in the full load condition of said diesel engine when said diesel engine is started, and said detected position is prohibited from being written in said first and second memory means during the starting period of said diesel engine.

4. A method for detecting a position of a fuel injection quantity adjusting member of a fuel injection pump according to claim 3, wherein said detected position is prohibited from being written in said first and second memory means until the speed of rotation of said diesel engine is decreased equal to or less than a prescribed speed of rotation after the speed of rotation of said diesel engine is temporarily increased equal to or more than said prescribed speed of rotation during the starting period of said diesel engine.

5. A method for detecting a position of a fuel injection quantity adjusting member of a fuel injection pump according to claim 3, wherein a detected position detected by said position detecting means is prohibited from being written in said first and second memory means until a detected position detected by said position detecting means is more offset towards the low load side than the prescribed position during the starting period of said diesel engine.

6. An apparatus for detecting a position of a fuel injection quantity adjusting member of a fuel injection pump comprising a fuel injection quantity adjusting member for determining a fuel injection quantity, and a governor for maintaining the fuel injection quantity adjusting member in a low-speed side designed position and a high-speed side designed position which are constant in a prescribed low-speed rotation region and a prescribed high-speed rotation region when a diesel engine is rotated in a full load condition, the apparatus comprising:

position detecting means for detecting the position of said fuel injection quantity adjusting member, writing means for writing a detected position output from said position detecting means in first memory means when the under-listed conditions (a) through (c) are satisfied, and for writing the detected position output from said position detecting means in second memory means when the under-listed conditions (d) through (f) are satisfied, characteristic calculating means for calculating an output characteristic of said position detecting means based on the detected positions written respectively in said first and second memory means and said low-speed and high-speed side designed positions, and correcting means for correcting the detected position detected by said position detecting means based on the output characteristic calculated by said characteristic calculating means, (a) a speed of rotation of said diesel engine is within the low-speed rotation region;

(b) the detected position output from said position detecting means is within a low-speed side position range having a prescribed largeness which is predetermined with reference to said low-speed side designed position;

(c) the detected position output from said position detecting mean is offset towards a high-load side from the position which is written in said first memory means;

(d) the speed of rotation of said diesel engine is within the high-speed rotation region;

(e) the detected position output from said position detecting means is within a high-speed side position range having a predetermined largeness which is determined with reference to said high-speed side designed position;

(f) the detected position output from said position detecting means is offset towards the high-load side from the position which is written in said second memory means.

7. An apparatus for detecting a position of a fuel injection quantity adjusting member of a fuel injection pump according to claim 6, wherein said diesel engine is provided with a charger, said governor is provided with a position adjusting mechanism for adjusting a position of said fuel injection quantity adjusting member in such a manner as to correspond to a boosted pressure when the boosted pressure of an intake gas to be supplied to said diesel engine from said charger is equal to or more than a prescribed pressure, said low-speed side position range is determined with reference to a low-speed side designed position in a full load condition of said diesel engine when said boosted pressure is equal to or less than said prescribed pressure, and said high-speed side position range is determine with reference to a high-speed side designed position in a full load condition of said diesel engine when said boosted pressure is maximum.

8. An apparatus for detecting a position of a fuel injection quantity adjusting member of a fuel injection pump according to claim 6 or 7, wherein said governor includes a starting time quantity increasing mechanism for moving said fuel injection quantity adjusting member towards the high load side than in the full load condition of said diesel engine when said diesel engine is started, and said apparatus further comprises prohibiting means for prohibiting said writing means from writing said detected position in said first and second memory means when the diesel engine is started.

9. An apparatus for detecting a position of a fuel injection quantity adjusting member of a fuel injection pump according to claim 8, wherein said writing means is prohibited from writing said detected position in said first and second memory means until the speed of rotation N of said diesel engine is decreased equal to or less than a prescribed speed of rotation after the speed of rotation of said diesel engine is temporarily increased equal to or more than said prescribed speed of rotation during the starting period of said diesel engine.

10. An apparatus for detecting a position of a fuel injection quantity adjusting member of a fuel injection pump according to claim 8, wherein said prohibiting means prohibit said writing means from writing a detected position detected by said position detecting means in said first and second memory means until a detected position detected by said position detecting means is more offset towards the low load side than the prescribed position.

* * * * *